US006406561B1

United States Patent
Creech et al.

(10) Patent No.: US 6,406,561 B1
(45) Date of Patent: Jun. 18, 2002

(54) ONE-STEP NOBLE METAL-ALUMINIDE COATINGS

(75) Inventors: George E. Creech, Indianapolis; Subhash K. Naik, Carmel, both of IN (US); Paul S. Korinko, Aiken, SC (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/354,616

(22) Filed: Jul. 16, 1999

(51) Int. Cl.[7] ............................................. C23C 22/70
(52) U.S. Cl. ...................... 148/242; 148/678; 427/191; 427/192
(58) Field of Search ................................ 148/242, 678; 427/191, 192; 428/670

(56) References Cited

U.S. PATENT DOCUMENTS

| | | | |
|---|---|---|---|
| 3,979,273 A | 9/1976 | Panzera et al. | 204/192 |
| 3,999,956 A | 12/1976 | Stueber et al. | 29/194 |
| 4,070,507 A | 1/1978 | Stueber et al. | 427/252 |
| 4,439,470 A | 3/1984 | Sievers | 427/252 |
| 4,656,099 A | 4/1987 | Sievers | 428/610 |
| 5,057,196 A | 10/1991 | Creech et al. | 204/181.5 |
| 5,292,594 A | 3/1994 | Liburdi et al. | 428/650 |
| 5,482,578 A | 1/1996 | Rose et al. | 148/516 |
| 5,492,726 A | 2/1996 | Rose et al. | 427/252 |
| 5,514,482 A | 5/1996 | Strangman | 428/623 |
| 5,667,663 A | 9/1997 | Rickerby et al. | 205/170 |
| 5,688,607 A | 11/1997 | Rose et al. | 428/639 |
| 5,763,107 A | 6/1998 | Rickerby et al. | 428/623 |
| 5,873,951 A | 2/1999 | Wynns et al. | 148/242 |
| 5,958,204 A | 9/1999 | Creech et al. | 204/487 |
| 5,997,604 A | * 12/1999 | Rafferty et al. | 75/233 |

FOREIGN PATENT DOCUMENTS

EP          0 821 078 A1    1/1998

* cited by examiner

Primary Examiner—John Sheehan
Assistant Examiner—Andrew L. Oltmans
(74) Attorney, Agent, or Firm—Woodard, Emhardt, Naughton Moriarty & McNett

(57) ABSTRACT

A "one-step" method of forming diffused noble metal-aluminide coatings with or without minor incorporations of Si, Cr, Mn, Hf, La, and Y, is disclosed. With the inventive method, two or more powdered metals or metal alloys are applied and diffused into the metal substrate together, using a sequential multi-stage heating process. This method contrasts with the prior art technology where metals were applied and diffused into the substrate separately.

32 Claims, 8 Drawing Sheets

ONE-STEP NOBLE METAL-ALUMINIDE COATINGS

FIELD OF THE INVENTION

The present invention relates generally to aluminide coatings, and more particularly to a one-step process for forming diffused noble metal-aluminide coatings.

BACKGROUND OF THE INVENTION

In the gas turbine engine industry, high temperature corrosion- and oxidation-resistant protective coatings for nickel-based and cobalt-based alloy components, such as blades and vanes, are required. These coatings are particularly useful for new generation gas turbine engines that are designed to operate at higher turbine inlet temperatures for greater engine performance and fuel efficiency.

Diffused aluminide coatings have been used to protect alloy components in the turbine section of gas turbine engines. In general, a diffused aluminide coating is formed by applying an aluminum-based powder to an alloy substrate and heating it to diffuse the aluminum into the substrate.

Diffused aluminide coatings may include chromium or manganese to increase their hot corrosion/oxidation resistance. Furthermore, addition of noble metals, such as platinum, to provide platinum-aluminide coatings, has markedly improved hot oxidation resistance. However, formation of these modified aluminide coatings requires additional processing steps and more complex diffusion heat treatment regimes.

Specific examples of known coating processes include providing a platinum-enriched aluminide surface by electroplating a thin film of platinum onto a carefully cleaned alloy substrate, overaluminizing the platinum thin film by applying an activated aluminum-bearing coating via pack cementation, CVD, thermal spray or other known application methods, and then heating the coated substrate at a temperature and for a time sufficient to form the platinum-enriched diffused aluminum coating. Optionally, the platinum may be diffused into the substrate either prior to or after the application of the aluminum. It is also known to form the modified diffused aluminide coating by employing a sequential two-step electrophoretic deposition process with a diffusion heat treatment following each electrophoretic deposition step. (See U.S. Pat. No. 5,057,196 to Creech et al., which is incorporated by reference herein.)

All of the known prior art processes use a multi-step application procedure to sequentially apply a platinum-enriched layer and an aluminum-bearing layer followed by diffusion heat treatment to provide modified noble metal-aluminide coatings. These multi-step processes are expensive and time consuming, and make the application of such coatings less advantageous from a commercial viewpoint. While the cost of noble metals and chromium group metals included in the modified aluminide coatings constitute a significant cost of the coatings, the costs associated with the processing methods are an equally significant if not greater cost of the coatings.

A need therefore exists for methods to streamline the noble metal-aluminide coating processes to improve efficiency, decrease cost and provide an effective corrosion- and/or oxidation-resistant protective coating for nickel or cobalt-based alloy substrates. The present invention addresses that need.

SUMMARY OF THE INVENTION

Generally describing the present invention, a "one-step" method of forming a diffused aluminide coating is provided. With the inventive method, two or more powdered metals or metal alloys are applied and diffused into the metal substrate together, preferably using a multi-stage heating process. This method contrasts with the prior art technology where powdered metals were applied and diffused into the substrate separately.

A variety of powdered metals may be applied with the inventive one-step method. In general, the coating compositions preferably comprise a mixture of: (1) a platinum powder, and (2) an aluminum-bearing component. The platinum powder preferably includes silicon either as a pre-alloy powder or an alloy powder. In one embodiment, the aluminum-bearing component includes an aluminum alloy powder comprising aluminum and chromium, although manganese is also added in some preferred embodiments. In other preferred embodiments, an aluminum powder is used either in addition to, or in place of, the aluminum alloy powder. In yet other preferred embodiments, hafnium, yttrium and/or lanthanum are added to one of the aforementioned powders, or are added to the green coating composition separately.

In the coating composition described above, a portion or all of the platinum in the platinum powder can be replaced by other noble group metals, for example, palladium, ruthenium, and rhodium.

Regardless of the metals used, the inventive one-step method diffuses all of the metals into the substrate together. To do that, a multi-stage heating process is preferably employed. With the multi-stage heating process, the powder-covered substrate is initially heated to a first temperature to begin the diffusion process, and is then heated to a second temperature to complete the diffusion. In some embodiments a pre-diffusion heat treatment is also used.

One object of the present invention is to provide a simple, economical method of providing diffused noble metal-aluminide coatings.

Further objects and advantages of the present invention will be apparent from the description provided below.

DETAILED DESCRIPTION OF THE INVENTION

Figure 1:
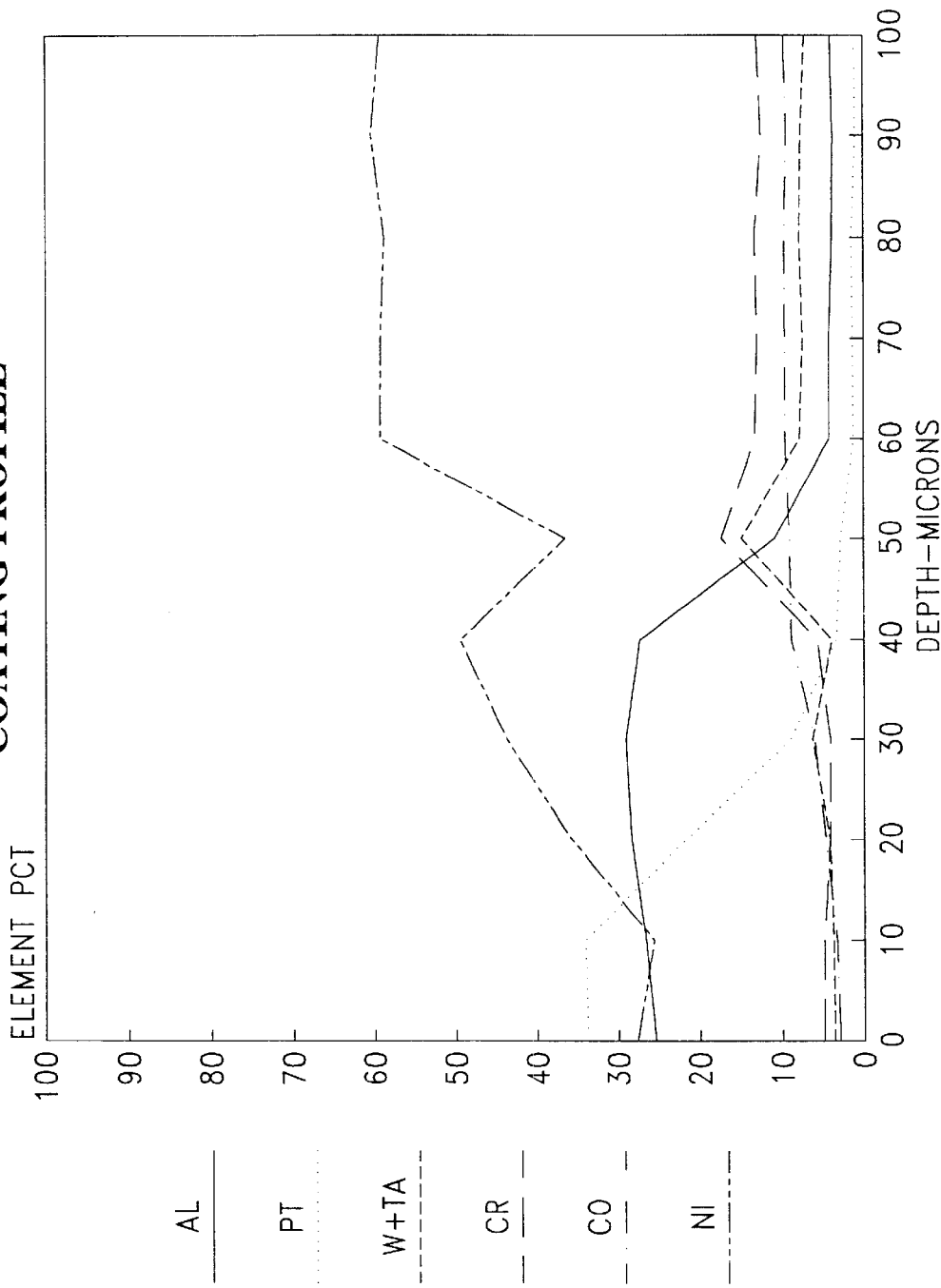
FIG. 1. is a graph illustrating the composition profile of a prior art diffused platinum-aluminide coating.

For the purposes of promoting an understanding of the principles of the invention, reference will now be made to preferred embodiments and specific language will be used to describe the same. It will nevertheless be understood that no limitation of the scope of the invention is thereby intended. Any alterations and further modifications in the described processes, coatings, or compositions and any further applications of the principles of the invention as described herein are contemplated as would normally occur to one skilled in the art to which the invention relates.

As briefly described above, the present invention provides a "one-step" method of forming a diffused noble metal-aluminide coating on metallic substrates. While this invention finds advantageous use in forming noble metal-aluminide coatings on nickel and cobalt based substrates, it is particularly useful for repairing and recoating metallic substrates that have defective noble metal-aluminide coatings.

In the most preferred aspects of the present invention a single "green" coating composition (i.e. the composition that is applied to the substrate—before heat treatment or other curing) comprising two or more powdered metals is applied to a metal substrate or a portion of the substrate having the defective coating. The coated substrate is then heated by increasing the temperature at a controlled rate or, more preferably, via a multi-stage heating process to form the diffused noble metal-aluminide coating. The process provides the advantage of being operable at significantly reduced cost and effort when compared with conventional coating techniques.

1. Substrates

The coating compositions of the present invention can be applied to the surface of a wide variety of substrates, with nickel- or cobalt-based alloy substrates being most preferred. Examples of alloys that can be protected with the noble metal-aluminide coatings according to the present invention include, but are not limited to: nickel-based alloys such as IN738, IN792, Mar-M246, Mar-M247; single crystal nickel alloys such as CMSX-3 or CMSX-4; and cobalt-based alloys such as Mar-M509 and X40, all of which are known to those in the art.

2. The "Green" Coating Compositions

More particularly describing the metals used in the green coating compositions, one embodiment uses 40–80% (by weight of the total metal) of a first powder comprising 85–100% Pt and up to about 15% Si, and 20–60% of a second powder comprising 50–75% Al and 25–50% Cr. All percentages are listed herein weight percentages unless specified otherwise. A second embodiment of the present invention uses that same 40–80% of a first powder comprising 85–100% Pt and up to 15% Si, and that same 20–60% of a second powder comprising 50–75% Al and 25–50% Cr, and additionally up to 40% of a third powder comprising 95–100% Al.

In a third embodiment of the present invention the green coating composition comprises 40–80% of a first powder comprising 85–100% Pt and up to about 15% Si, and 20–60% of a second powder comprising 35–45% Al, 35–45% Cr, and 10–30% Mn. A fourth embodiment uses 40–80% of a first powder comprising 85–100% Pt and up to about 15% Si, and 20–60% of a second powder comprising 35–45% Al, 35–45% Cr, and 10–30% Mn, and additionally adds up to 40% of a third powder comprising 95–100% Al.

A fifth embodiment of the present invention uses a green coating composition that has only the first and third powders of the earlier embodiments, and accordingly comprises 50–80% of a first powder comprising 85–100% Pt and 0–15% Si, and 20–50% of a second powder comprising 95–100% Al.

In alternative embodiments, a portion or all of the platinum in the first powder composition can be replaced by other noble metals, for example, palladium, ruthenium, and rhodium. Alternatively, the first powder, the second powder, or the third powder can include up to about 5% Hf, Y, La or mixtures thereof. Further, in any of the embodiments described above, the green coating composition can include up to about 5% of a fourth powder comprising Hf, Y, or La or mixtures thereof, regardless of the mode of incorporation.

A summary of the embodiments described above is shown in Table 1.

TABLE 1

Coating Compositions

| | Platinum Powder | Aluminum-Bearing Component | | |
|---|---|---|---|---|
| | | Aluminum Alloy or Prealloy Powder (wt %)[2] | | Aluminum Powder (wt %)[2] |
| Embodiment | (wt %)[1,2] 85–100 Pt, 0–15 Si | 50–75 Al 25–50 Cr | 35–45 Al 35–45 Cr 10–30 Mn | 95–100 Al |
| 1 | 40–80 | 20–60 | — | — |
| 2 | 40–80 | 20–60 | — | Up to 40 |
| 3 | 40–80 | — | 20–60 | — |
| 4 | 40–80 | — | 20–60 | Up to 40 |
| 5 | 50–80 | — | — | 20–50 |

[1]A portion or all of the Platinum can be replaced by other noble metals, for example, palladium, ruthenium, and rhodium.
[2]The metallic components can include up to about 5% Hf, Y, La or mixtures thereof.

(a) Preferred compositions using Pt—Si powder and Al—Cr alloy powders.

As indicated above, the green coating composition may comprise about 40 to about 80 wt % (based on the weight of the metal used in the coating) of a platinum-bearing powder, most preferably a platinum-silicon powder. Preferably about 55 to about 70 wt % of the platinum-bearing powder is used. In addition, the green coating compositions include about 20–60% of an aluminum-bearing component comprising aluminum and chromium metal either as a mixture of metal powders or, preferably, an Al—Cr powdered alloy. Preferably the green coating composition includes about 30–45% of the aluminum-bearing component. The diffused platinum-silicon-enriched-aluminide coatings thus formed are generally high-temperature, oxidation-resistant coatings.

For the purposes of this written description, references to platinum-silicon powders are intended to include embodiments in which the amount of Pt is 100% and the Si is 0%, even though such embodiments might not normally be thought of as Pt—Si powders. As indicated above, the preferred embodiments include both Pt and Si.

When Pt—Si powders are used, the platinum-silicon powder can be an intimate mixture of elemental platinum and silicon, or it may be a powdered Pt—Si alloy. Preferably the platinum-silicon powder comprises about 85 to about 99 wt % platinum and about 1 to about 15 wt % silicon; more preferably, about 87 to about 97 wt % platinum and about 3 to about 13 wt % silicon. Optionally, the platinum-silicon also can include up to about 5% Hf, Y, La or the noble metal mixtures thereof.

The platinum-silicon alloy is preferably prepared by first mixing finely divided platinum powder with silicon powder at about 1 micron particle size, compacting the mixed powders into a pellet, and sintering the pellet in an argon atmosphere or other suitable protective atmosphere in a stepped-heat treatment. One such heat treatment includes sintering the pellet 1) at about 1,400° F. for 30 minutes, 2) at about 1,500° F. for about ten minutes, 3) at about 1,525° F. for about 30 minutes, 4) at about 1,800° F. for about 15 minutes, and then 5) at about 1,900° F. for about 30 minutes.

The sintered pellet is then reduced to approximately an average particle size of about 325 mesh by pulverizing in a steel cylinder and pestle and then ball milling the pulverized particles in a vehicle (typically, 60 wt % isopropanol and about 40 wt % nitromethane) for 10 to 30 hours under an inert atmosphere, such as argon, to produce a platinum-silicon alloy powder typically in the 1–10 micron particle size range. Such alloy powder may also be produced by other suitable methods known in the art, such as gas atomization.

As to the aluminum-chromium alloy portion of the green coating compositions, the coatings preferably comprise about 20 to about 60 wt % (based on the weight of the metal used in the coating) of the aluminum-chromium prealloy or alloy powder. More preferably, the coating composition includes about 30 to about 45 wt % of the aluminum-chromium alloy. The aluminum-chromium alloy includes about 50 to about 75 wt % aluminum and about 25 to about 50 wt % chromium; more preferably, about 68 to about 72 wt % aluminum and about 28 to about 32 wt % chromium. Optionally, the aluminum-chromium alloy also can include up to about 5% Hf, Y, La or mixtures thereof.

The aluminum-chromium alloy can be provided as an alloy powder prepared according to standard processes known in the art. Suitable aluminum-chromium alloys are commercially available. An aluminum-chromium alloy that includes about 55 wt % aluminum and about 45 wt % chromium is commercially available. The powdered alloy preferably has an average particle size of about 3 to about 10 microns.

(b) Preferred compositions using Pt—Si powder, Al—Cr alloy powder, and an additional Al-bearing component.

Optionally the coating composition using Pt—Si powder and Al—Cr alloy powder can also include up to about 40 wt % of an additional aluminum-bearing component that includes aluminum powder. More preferably the coating composition includes about 2 to about 20 wt % of the additional aluminum-bearing component.

The additional aluminum-bearing component may consist essentially of aluminum metal powder. Alternatively, the additional aluminum-bearing component may comprise at least about 95 wt % aluminum metal and up to about 5 wt % of a metal selected from the group consisting of Hf, Y, La, and mixtures thereof. The aluminum-bearing component can be an intimate mixture of metal powders or a powdered alloy. When an aluminum-bearing component is a powdered alloy, it is different in composition from the Al—Cr alloy powder discussed above.

In certain preferred embodiments the non-diffused coating composition also includes one or more additional metallic materials to modify the physical and chemical properties of the coated substrate. Examples of metallic materials that can be included in the coating composition include: Y, Hf, La, as well as and other noble metals (e.g., Pd, Rh, and Ru and mixtures thereof).

(c) Preferred compositions using Pt—Si powder and Al—Cr—Mn alloy powders.

In another preferred embodiment the green coating composition comprises about 40 to about 80 wt % of a platinum-silicon powder, more preferably about 55 to about 65 wt %, and about 20 to about 60 wt % of an aluminum-bearing component comprising Al, Cr and Mn metals either as a mixture of metal powders or, preferably, an Al—Cr—Mn powdered alloy. More preferably, the green coating composition includes about 35 to about 45 wt % of the aluminum-bearing component comprising Al, Cr and Mn. The diffused platinum-silicon-manganese-enriched-aluminide coatings thus formed are generally high corrosion-resistant coatings.

As with the previous embodiments, the platinum-silicon powder is preferably a powdered alloy; although, an intimate mixture of the platinum and silicon metals can be used in this invention. The preferred composition of the platinum-silicon powder is as described above.

The Al—Cr—Mn alloy is also generally as described above, although the addition of manganese makes the preferred amounts of the various metals somewhat different. In this embodiment, the aluminum alloy includes about 35 to about 45 wt % aluminum, about 35 to about 45 wt % chromium and about 10 to about 30 wt % manganese, with about 38 to about 44 wt % aluminum, about 38 to about 42 wt % chromium, and about 16 to about 22 wt % manganese being more preferred. Optionally, the Al—Cr—Mn alloy also can include up to about 5% Hf, Y, La or mixtures thereof.

The aluminum-chromium-manganese alloy can be provided as an alloy powder prepared according to standard processes known in the art and is commercially available. The commercially prepared powdered alloy has an average particle size of about 3 to about 10 microns.

(d) Preferred compositions using Pt—Si powder, Al—Cr—Mn alloy powder, and an additional Al-bearing component.

As with the case of the Pt—Si/Al—Cr alloy powder embodiments, the Pt—Si/Al—Cr—Mn embodiments may also include up to about 40 wt % of an additional aluminum-bearing component that includes aluminum powder. More preferably, about 5 to about 20 wt % of the additional aluminum-bearing component is used.

Also as above, the aluminum-bearing component may consist essentially of aluminum metal powder. Alternatively, the aluminum-bearing component can include greater than 95 wt % aluminum metal and up to about 5 wt % of a metal selected from the group consisting of Hf, Y, La, and mixtures thereof. The aluminum-bearing component can be an intimate mixture of metal powders or a powdered alloy. The aluminum-bearing component can be prepared by standardized processes well-known in the art, with the aluminum preferably being provided in powder form with a particle size of about 1 to about 10 microns.

This coating composition provides a high corrosion resistant coating for nickel- and cobalt-based alloys. However, this coating finds particular advantages when used for nickel-based alloys.

(e) Preferred Compositions using Pt—Si powder and Al-bearing powder alone.

In yet another preferred embodiment of this invention, the green coating composition comprises about 50 to about 80 wt % of a platinum-silicon powder and about 20 to about 50 wt % of an aluminum-bearing component. More preferably the coating composition comprises about 60 to about 72 wt % of the platinum-silicon powder and about 28 to about 40 wt % of the aluminum-bearing component.

The platinum silicon powder is as described above.

The aluminum-bearing component may consist essentially of aluminum metal powder. Alternatively, the aluminum-bearing component comprises greater than 95 wt % aluminum metal and up to about 5 wt % of a metal selected from the group consisting of Hf, Y, La, and mixtures thereof. The aluminum-bearing component is prepared as described above.

This coating composition can be heat treated to form a platinum-aluminide coating that exhibits high temperature oxidation resistance for both nickel- and cobalt-based alloys.

3. Application of the Coating Green Compositions

Regardless of the number or composition of the various powders used to make the coating composition, the coating may be applied to a metal substrate using a variety of application methods known to the art. These include dipping, spraying, slurry deposition, electrophoretic and the like to provide a green coating on the substrate (i.e., the composition that is applied to the substrate—before heat treatment or other curing).

Typically, the green coating composition is suspended in a vehicle to form a slurry, which is applied in a single application onto the surface of the substrate to provide a single, homogeneous, non-diffused coating. Preferred application methods include electrophoretically depositing or painting the slurry onto the substrate surface.

The green coating composition can be electrophoretically deposited on the nickel or cobalt-based alloy substrate after first degreasing the substrate and then dry-honing the cleaned substrate using 220 or 240 grit aluminum oxide particles. The electrophoretic deposition step is carried out in an electrophoretic bath that includes a vehicle, zein, cobalt nitrate hexahydrate and the desired metallic powders. A sample electrophoretic bath contains:

(A) vehicle comprising: 60±5% by weight isopropanol, 40±5% nitromethane;

(B) metallic powder: 20 to 35 grams total coating composition per liter of vehicle;

(C) zein: 2.0 to 3.0 grams zein per liter of vehicle; and (D) cobalt nitrate hexahydrate (CHN): 0.10 to 0.20 grams CHN per liter of vehicle.

To effect electrophoretic deposition from the bath onto the nickel- or cobalt-based alloy substrates, the alloy substrate is immersed in the electrophoretic bath and connected in a direct current electrical circuit as a cathode. A metallic strip, for example, stainless steel, nickel or other conductive metal, is used as the anode and is immersed in the bath adjacent to the alloy substrate (cathode).

A current density of about 1 to about 2 mA/cm$^2$ is applied between the substrate (cathode) and the metallic strip (anode) for a time of about 1 to 4 minutes, while the bath is stirred to keep the desired metallic powders in suspension and, preferably, maintained at room temperature. During this time, a mixture of platinum-silicon powder and the aluminum containing alloy and/or the aluminum-bearing component are deposited as a homogenous, uniform-thickness powder deposit on the substrate surface.

The coated substrate is then removed from the electrophoretic bath and air dried to evaporate any residual solvent. The weight of the dry coating deposited on the substrate is optimally about 20 to about 40 mg/cm$^2$, although coating weights from about 10 to about 50 mg/cm$^2$ are suitable.

The coating composition also can be applied by a slurry deposition method to the substrate. Typically the slurry is applied by spraying, dipping or painting the substrate to provide a smooth, homogenous, and uniformly thick coating on the substrate. Good results are obtained when the coating is painted using a soft bristle brush.

The slurry preferably contains a mixture of isopropanol and nitromethane in a 60:40 weight ratio to suspend the powdered coating composition. However, it is understood that other vehicles that do not inhibit formation of the aluminide diffusion coating may also be used.

Most preferably, the selected vehicle maintains the metallic and alloy powders in suspension and has sufficient volatility to permit rapid drying of the coated substrate.

Typically, the slurry contains zein (about 30 g per liter of vehicle) and about 500 to about 1000 g of the coating composition per liter of vehicle. It is understood that the zein concentration and the coating composition concentration in the vehicle are not critical to practice this invention. Therefore, the concentration of the coating composition and/or zein can be varied to provide a uniform coating having an optimum coverage using a brush, a spray gun or other application equipment and methods.

It is to be appreciated from the above that the green coating composition is preferably a homogeneous mixture of the coating materials. In the preferred commercial embodiments, the green coating composition is prepared by mixing the various materials together before applying the coating.

4. Heat Treatment to Diffuse the Applied Coatings

As indicated above, the inventive one-step method preferably uses a sequential multi-stage heating process to diffuse the powdered coating compositions into the substrate. In the first heating stage the powdered metal is preferably heated until it forms a transient liquid phase on the metal substrate. To accomplish that, It is generally preferred to first heat the coated substrate to a temperature of about 900–1,600° F. for about 0.25 to 2 hours. More preferably, the non-diffused coated substrate is subjected to a first heat diffusion treatment of about 1,100 to about 1,400° F. for about 0.25 hours to about 2 hours.

In the second heating stage the coated substrate is heated sufficiently to diffuse the coating into the substrate. Typically, the temperature is raised from the first stage to the second stage in the furnace. Generally, a temperature of about 1,600–2,100° F. and a heating time of one to eight hours is effective for that stage. More preferably, the second heating stage uses a temperature of about 1,850° F. to about 2,080° F. and a time of about one to eight hours.

In some preferred embodiments it is advantageous to use a pretreatment heating step as part of, or before, the first heating stage. With this method the first heating stage is preferably accomplished by heating the coated substrate to a first temperature of about 950° F. to about 1,150° F. for about 0.5 to about 1.0 hours.

It is to be appreciated that the multiple heating stages may be accomplished by "ramping" the temperature upward from the lower heat treatment temperature to the higher heat treatment temperature. With that technique, there may be no clear break between the first heating stage and the second heating stage, as the two stages run smoothly into each other.

The diffusion heat treatment is preferably accomplished in vacuum, hydrogen, argon, or other suitable furnace atmosphere.

In one preferred embodiment the green coated substrate is subjected to a pre-diffusion temperature of about 950° F. to about 1,150° F. for 0.5 to about 1 hour. Thereafter, the coated substrate is heated to about 1,200° F. to about 1,400° F. for about 1 hour and then to about 1,900° F. to about 1,975° F. for about 1 to about 8 hours. In another preferred embodiment the diffused platinum-aluminide coating is formed by heating the non-diffusion coated substrate up to a temperature of about 900° F., and thereafter heating the coated substrate up to a temperature of about 1,400° F. by judicious selection of a carefully controlled temperature ramp rate, followed by a higher temperature hold at about 1,900° F. to 2,100° F. for about 1 to about 8 hours.

While not intending to be bound by any theory, it is thought that the aluminum in the aluminum-bearing material (s) melts and all other components in the coating composition interdiffuse in the molten aluminum. After sufficient time to interdiffuse the components of the coating composition, the coated substrate is heated to a second temperature, higher than the first temperature, to diffuse the coating composition into the substrate.

In FIG. 1 a graph of a composition profile of a typical prior art platinum-aluminide coating is presented. This platinum-aluminide coating is formed by electroplating a thin platinum layer on a nickel alloy (IN792), then over-aluminizing the platinum layer using an aluminum pack cementation process. The microstructure is typically a dual-layer structure having an outer layer consisting of light-etching islands of platinum-rich phases. The platinum content is about 35 wt % at the surface, and the aluminum content is about 20 wt %.

For the purpose of promoting further understanding and appreciation of the present invention and its advantages, the following Examples are provided. It will be understood, however, that these Examples are for illustrative purposes only, and are not intended to limit the scope of the claimed invention.

EXAMPLE 1

Platinum-Silicon/Aluminum-Alloy Coating

A nickel-alloy based coupon designated as Mar-M247 was cleaned by dry honing with 220 grit aluminum oxide. A slurry coating composition comprised of about 1 g/ml of a mixture of 65 wt % of platinum-silicon prealloy powder (90:10; Pt:Si) and 35 wt % of an aluminum-alloy (70:30; Al:Cr) and zein (0.03 g/ml) was suspended in a vehicle comprising about 60±5 wt % isopropanol and about 40±5 wt % nitromethane. After the coating composition was brushed on the coupon, the coupon was air dried to evaporate the residual solvent. The coated coupon was heated in vacuum to a first hold temperature of about 1,350° F. for one hour and thereafter heated to a second hold temperature of about 2,000° F. for two hours to form the diffused platinum-aluminide coating.

The coated coupon was removed from the furnace and allowed to cool to room temperature. The coated coupon was lightly cleaned by dry honing with 220 grit aluminum oxide.

Figure 2:
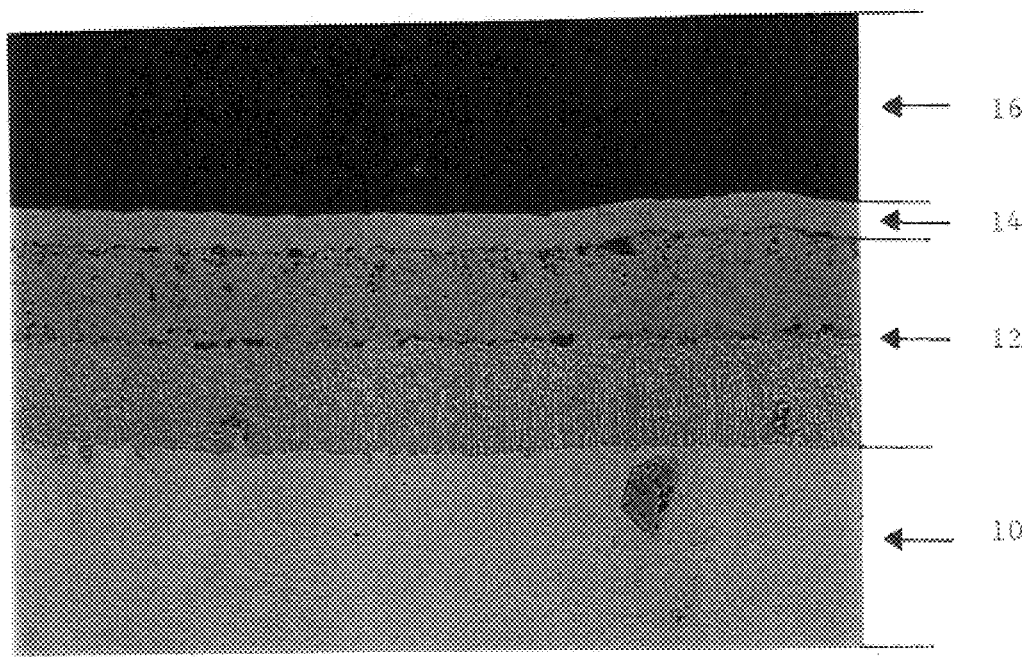
FIG. 2 is a scanned image of a micrograph of one embodiment of a one-step, diffused platinum-silicon-enriched aluminide coating prepared according to Example 1 of this invention.

FIG. 2 shows a scanned image of a micrograph of the one-step, diffused platinum-silicon-enriched-aluminide coating of Example 1. As can be seen from the Figure, the diffused aluminide coating is typically about 2–2.5 mils thick. The nickel-based alloy substrate 10 includes a diffused platinum-aluminide coating 12 formed as a substantially single layer, which may include multiple zones and a diffusion zone. The diffused coating composition includes about 20 wt % platinum, about 4 wt % chromium, about 25 wt % aluminum and about 3 wt % silicon. Layers 14 and 16 are the nickel and Bakelite layer used in the metallographic preparation of the coupon.

EXAMPLE 2

Platinum-Silicon/Aluminum Alloy/Aluminum Metal Coating

A nickel-based Mar-M247 coupon was suspended in an electrophoretic bath composition. The electrophoretic bath composition contained 30 g/ml of a mixture a 60 wt % platinum-silicon alloy (90:10 platinum:silicon), 30 wt % of an aluminum-chromium alloy (70:30 aluminum:chromium) and 10 wt % of aluminum powder suspended in a vehicle that contained 60 wt % isopropanol alcohol, 40 wt % nitromethane, zein (2.0 to 3.0 g/liter) and cobalt nitrate hexahydrate (0.1 to 0.2 g/liter). The coupon was immersed approximately equidistant between the two anodes strips. An electrical current of 5.5 mA at 62 volts was applied between the substrate (cathode) and the anodes for about two minutes. During this time, a green coating composition comprising the platinum-silicon alloy powder, the aluminum-chromium alloy and the aluminum metal was deposited as a uniform coating on the substrate coupon. The coated coupon was removed from the bath and air dried to remove residual solvent.

The dried coated substrate was then heated in vacuum using a pre-diffusion heat treatment of about 1,100° F. for about 1 hour, then a first hold treatment of about 1,225° F. for about 1 hour, then to a second hold treatment of about 1,925° F. for about 6 hours. The temperature and time of the diffusion heat treatments were selected to melt the deposited green coating to form a transient liquid phase evenly and uniformly covering the substrate surface. After the coated substrate had been diffusion heat treated, the coupon was cooled to room temperature. The coupon was then cleaned by lightly dry honing to remove the undiffused residual bisque.

Figure 3:
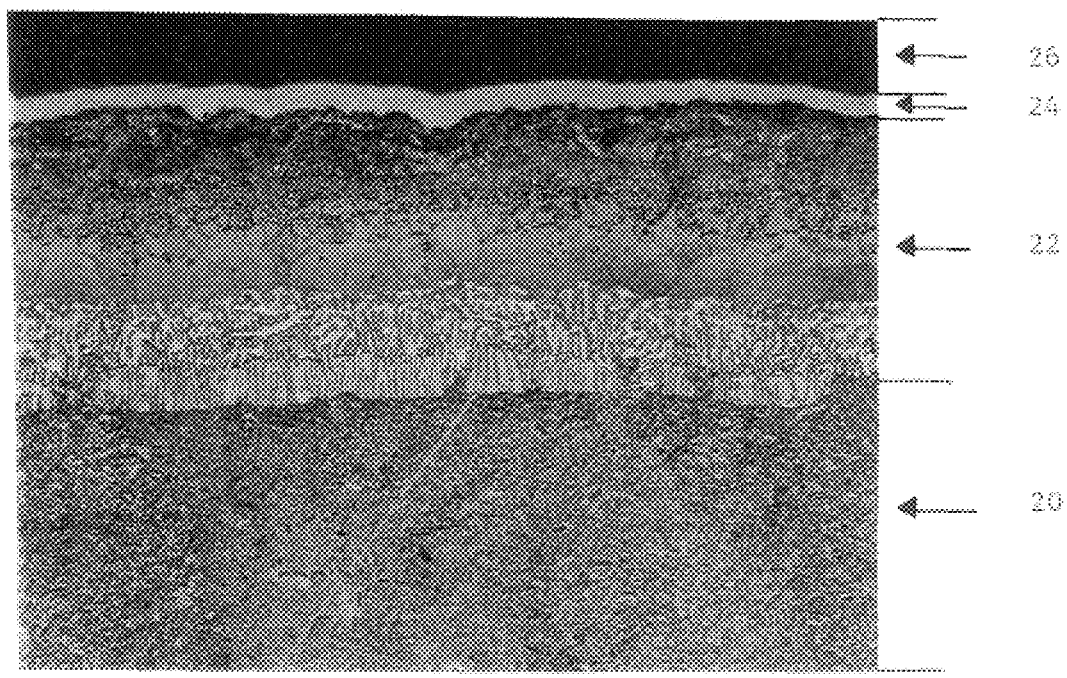
FIG. 3 is a scanned image of a micrograph of one embodiment of a platinum-silicon-enriched aluminide diffusion coated coupon prepared according to Example 2 of the present invention using an electrophoretic bath.

A scanned image of micrograph of the platinum-enriched aluminide diffusion coated coupon is depicted in FIG. 3. The nickel-based alloy substrate 20 is coated with a platinum-silicon-enriched diffused aluminide coating 22. Generally, the diffused coating composition has similar amounts of platinum, aluminum, chromium, and silicon as in Example 1. As with FIG. 2, the nickel and Bakelite metallographic layers 24 and 26, respectively, are used to prepare the sample for the photograph.

EXAMPLE 3

Platinum-Silicon/Aluminum-Alloy Coating

A nickel-alloy based coupon designated as Mar-M247 was cleaned by dry honing with 220 grit aluminum oxide. A slurry coating composition comprised of about 1 g/ml of a mixture of 60 wt % of platinum-silicon prealloy powder (90:10; Pt:Si) and 40 wt % of an aluminum-alloy (41:39:20; Al:Cr:Mn) and zein (0.03 g/ml) was suspended in a vehicle that comprised about 60±5 wt % isopropanol and about 40±5 wt % nitromethane. After the green coating composition was brushed on the coupon, the coupon was air dried to evaporate the residual solvent. The coated coupon was heated in vacuum to a first hold temperature of about 1,500° F. for one hour and thereafter heated to a second hold temperature of about 2,000° F. for two hours to form the diffused platinum-aluminide coating.

The coated coupon was removed from the furnace and allowed to cool to room temperature. The coated coupon was lightly cleaned by dry honing with 220 grit aluminum oxide.

Figure 4:
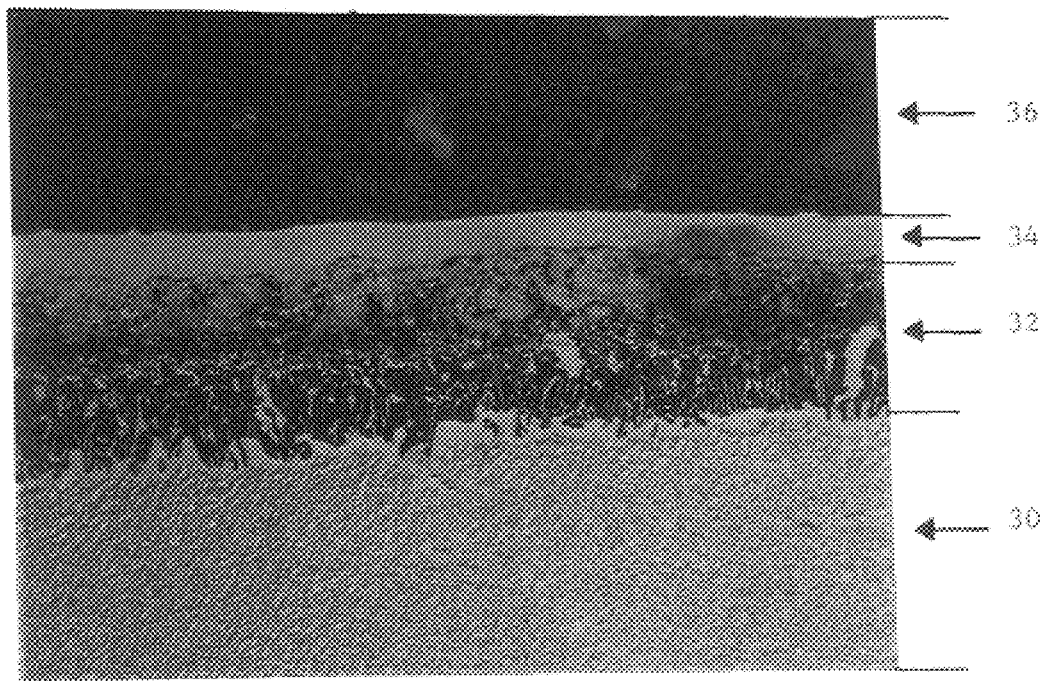
FIG. 4 is a scanned image of a micrograph of one embodiment of a nickel-alloy based coupon coated with a diffused platinum-silicon-manganese-enriched-aluminide coating prepared according to Example 3 of the present invention using a slurry coating composition.

FIG. 4 shows a scanned image of a micrograph of the diffused platinum-aluminide coating of Example 3. As can be seen from the Figure, the diffused aluminide coating is typically about 1.5–2.0 mils thick. The diffused coating composition contains about 1 wt % manganese in addition to platinum, aluminum, chromium, and silicon. The nickel-based alloy substrate 30 includes a diffused platinum-aluminide coating 32 formed as a substantially single layer. Layers 34 and 36 are the nickel and Bakelite layer used in the metallographic preparation of the coupon.

EXAMPLE 4

Formation of a Modified Aluminide Coating Using a Three-Step Sequential Thermal Diffusion Treatment A nickel-based alloy (Mar-M247) pin was prepared for diffusion coating and coated using an electrophoretic bath as described in Example 2 using an electrophoretic bath that included the a mixture of 50 wt % of a platinum-silicon alloy (90:10; Pt:Si), 35 wt % of an aluminum-chromium-manganese alloy (41:39:20 aluminum:chromium: manganese) and 15 wt % aluminum metal.

The green-coated pin was heated under vacuum to a temperature of about 1,100° F. for about 1 hour, then to a temperature of about 1,225° F. for about 1 hour and thereafter to a temperature of about 1,925° F. for about 6 hours.

Figure 5:
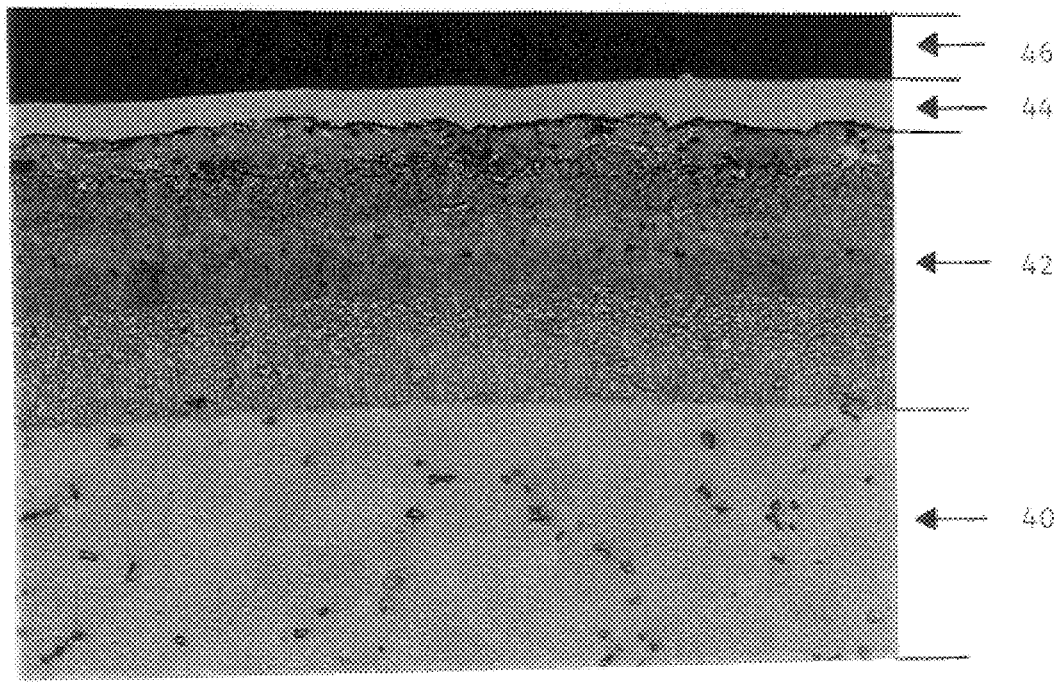
FIG. 5 is a scanned image of a micrograph of one embodiment of a nickel-based alloy pin coated with a diffused platinum-silicon-manganese-enriched-aluminide coating prepared according to Example 4 of the present invention using an electrophoretic bath.

The resulting diffused coating composition on the nickel alloy pin had an average coating thickness of about 2.5–3.0 mils and exhibited the characteristic non-porous layer of an optimal platinum-aluminide diffusion coating. A scanned image of a micrograph of the platinum-silicon-manganese-enriched aluminide coating on a pin is illustrated in FIG. 5. The nickel-based alloy substrate 40 includes a diffused platinum-aluminide coating 42 formed as a substantially single layer. Layers 44 and 46 are the nickel and Bakelite layers used in the metallographic preparation of the pin.

EXAMPLE 5

Platinum-Silicon/Aluminum Coating

A nickel-alloy based coupon was cleaned by dry honing with 220 grit aluminum oxide. A slurry coating composition comprised of about 1 g/ml of a mixture of 70 wt % of platinum-silicon prealloy powder (90:10; Pt:Si) and 30 wt % of aluminum and zein (0.03 g/ml) was suspended in a vehicle that comprised about 60±5 wt % isopropanol and about 40±5 wt % nitromethane. After the green coating composition was brushed on the coupon, the coupon was air dried to evaporate the residual solvent. The coated coupon was heated in vacuum to a first hold temperature of about 1,225° F. for one hour and thereafter heated to a second hold temperature of about 2,000° F. for two hours to form the diffused platinum-aluminide coating.

The coated coupon was removed from the furnace and allowed to cool to room temperature. The coated coupon was lightly cleaned by dry honing with 220 grit aluminum oxide.

Figure 6:
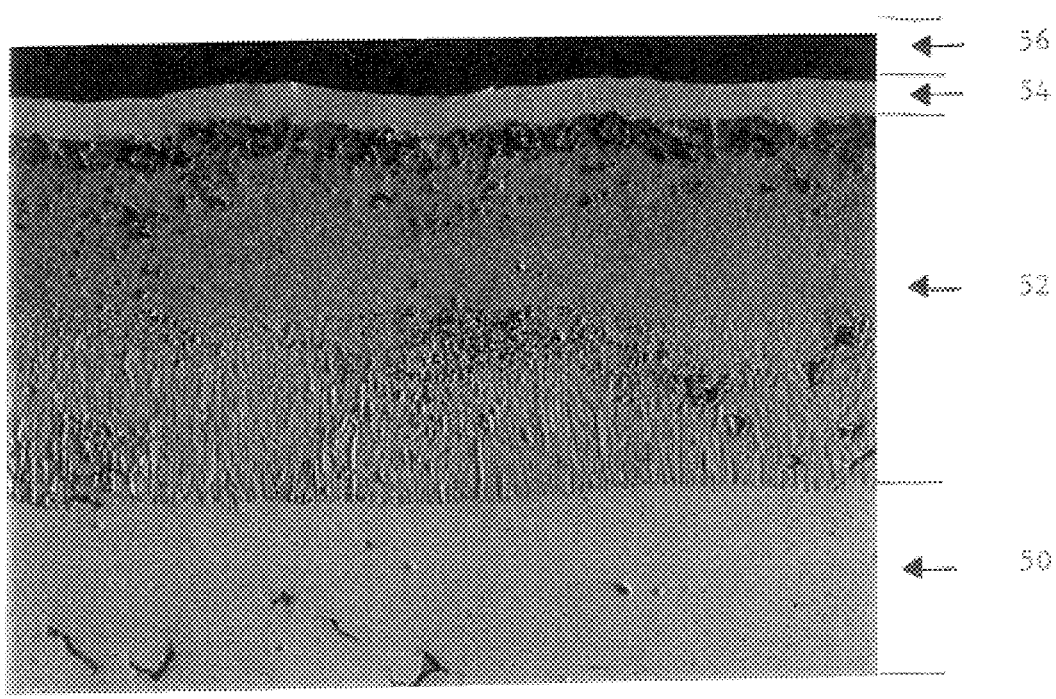
FIG. 6 is a scanned image of a micrograph of one embodiment of a platinum-silicon-enriched-aluminide coating on a nickel-based alloy prepared according to Example 5 of the present invention.

FIG. 6 shows a scanned image of a micrograph of the one-step, diffused platinum-aluminide coating of Example 5. As can be seen from the Figure, the diffused platinum-silicon-enriched aluminide coating is typically about 3.5 mils thick. The nickel-based alloy substrate 50 includes a diffused platinum-aluminide coating 52 formed as a substantially single layer, which may include multiple zones and a diffusion zone. Layers 54 and 56 are the nickel and Bakelite layer used in the metallographic preparation of the coupon.

EXAMPLE 6

Dynamic Oxidation Test

Figure 7:
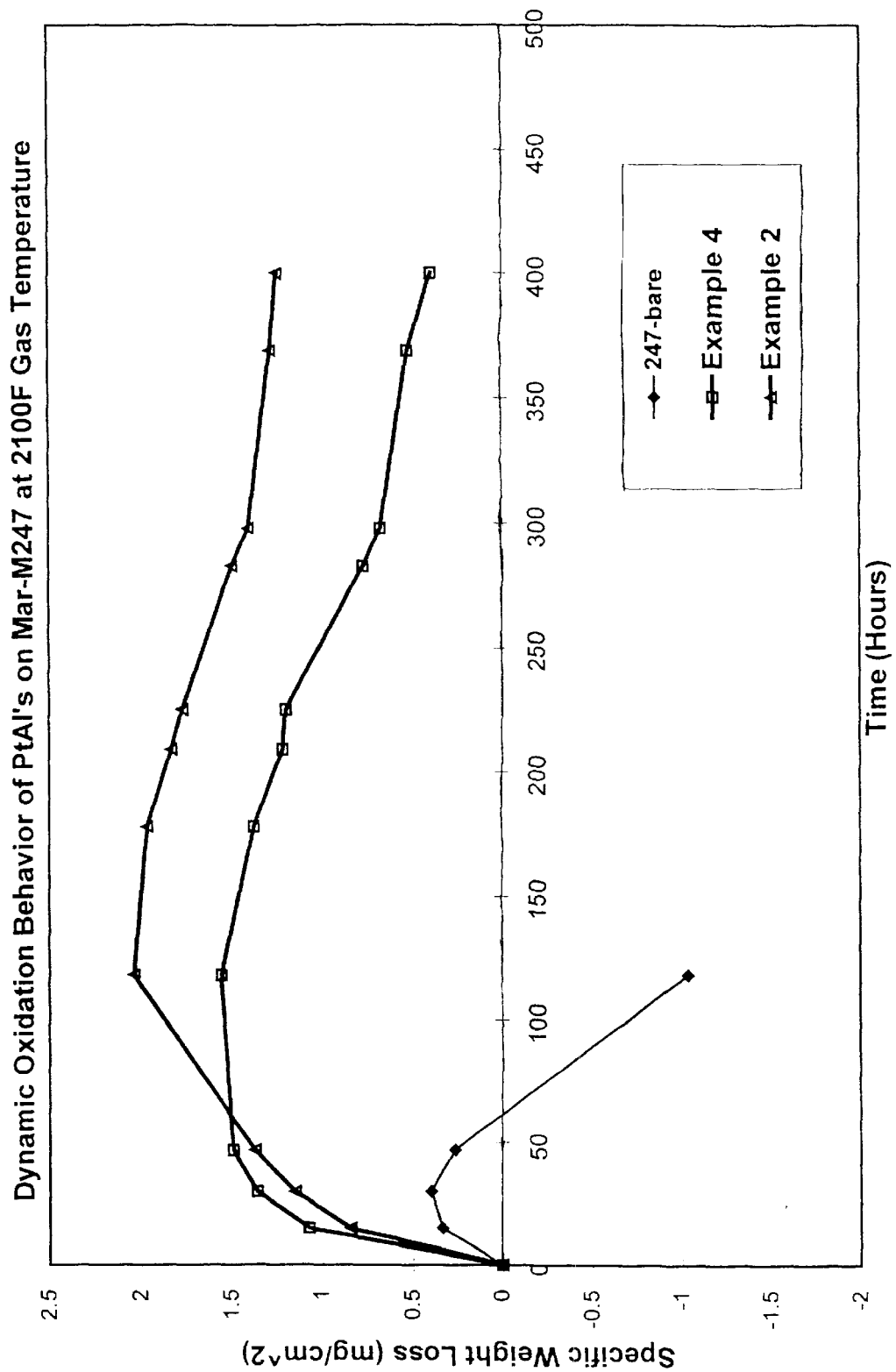
FIG. 7 is a graph depicting the specific weight loss of platinum-aluminide coatings of the present invention over time when subjected to a dynamic oxidation test.

A dynamic oxidation test was performed on pins formed of Mar-M247 alloys which were coated with the inventive platinum-aluminide coatings prepared in accordance to Examples 2 and 4. The dynamic oxidation test is a cyclic test in which a flame from burning JP-5 fuel impinges on a rotating carousel containing the coated pins at approximately 0.3 Mach velocity. The gas temperature was measured at 2,100° F. The coated pins were exposed to the flame for 55 minutes, then cooled by retracting them from the flame for 5 minutes, i.e. one cycle equals 1 hour of testing. One way of evaluating the effectiveness of the coating is to monitor the weight change per unit surface area exposed to the flame as a function of time. Typically, the test specimens initially gain weight due to oxide formation. As the samples are cycled, the original formed oxide gets thicker and eventually spalls and additional oxide forms. This spallation and formation continues until more oxide spalls than is replaced. The samples will continue to change weight and at some point, the net weight change is negative, i.e., the pins weigh less than their initial weight. The protection from oxidation is reduced at this time. Eventually, the oxidation rate becomes excessive and the coating is no longer protective. As can be seen from FIG. 7, the net weight change for a bare Mar-M247 pin is negative when exposed to the dynamic oxidation test for less than 100 hrs. However, the pins coated with the inventive platinum-aluminide coatings do not exhibit a net negative weight change even when they have been exposed to the dynamic oxidation test for more than 400 hrs.

EXAMPLE 7

Inventive Platinum-Aluminide Coatings on Turbine Hardware

Two inventive platinum-aluminide coatings were prepared according to Example 2 and 4. These coatings were successfully applied to both an unshrouded (Mar-M247) turbine blade and a shrouded (IN-738) turbine blade. The coatings thus formed were uniform in thickness, including along the knife edge seals on the shrouded blade. The coatings had microstructures similar to those observed on pins and coupons prepared in Example 2 and 4. This demonstrates a particularly useful quality of the present invention. Traditional processes for forming platinum-aluminide coatings using electroplating techniques often provide areas of non-uniform thickness coatings. The trailing edges on blades are specific areas that often exhibit formation of non-uniform thickness coatings due to high current densities on the edges. Typically, special additional fixturing is required to compensate for the differences in current densities that occur during the platinum plating.

Figure 8:
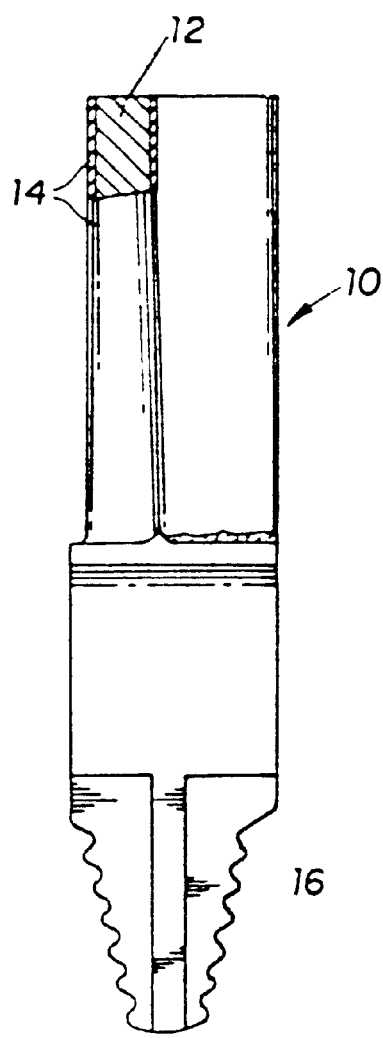
FIG. 8 is a schematic view (partly broken away and in section) of a typical turbine blade carrying a coating of the inventive diffused platinum-aluminide of the present invention.

The inventive process avoids this problem since the electrophoretically applied coating tends to be self-leveling, and the compositions developed in this invention result from a novel process where the diffused coating thickness is dependent upon the time and temperature of the heat treatment rather than on the application weight of the green coat. FIG. 8 is a schematic view (partly broken away and in section) of a typical turbine blade carrying a coating of the subject diffused platinum-aluminide coating. In that Figure, turbine blade 10 includes a nickel- or cobalt-alloy body portion 12 provided with a diffused aluminide coating 14 as described in this specification. For purposes of illustration, the thickness of coating 14 is exaggerated in FIG. 8, the actual thickness being on the order of a few thousandths of an inch as previously described. It is usually undesirable to provide the subject coating over the fastening portion 16 of blade 10.

It is contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

We claim:

1. A method of forming a diffused noble metal-aluminide coating on a metallic substrate, said method comprising:
    (a) applying a powdered metal coating composition comprising about 40% to about 80% (by weight of the total applied powdered metal) of a noble metal-containing powder, and about 20% to about 60% (by weight of the total applied powdered metal) of a powdered aluminum-bearing component comprising about 35% to about 45% aluminum, about 35% to about 45% chromium, and about 10% to about 30% manganese, to a metallic substrate to form a powdered metal-coated substrate;
    (b) heating the powdered metal-coated substrate to a temperature and for a time sufficient to form a transient liquid phase on the surface of the coated substrate; and subsequently
    (c) heating the substrate with the transient liquid phase thereon to a temperature and for a time sufficient to form a diffused noble metal-aluminide coating on the substrate.

2. The method of claim 1 wherein said noble metal-containing powder comprises a metal selected from the group consisting of platinum, palladium, ruthenium, rhodium or mixtures thereof.

3. The method of claim 1 wherein said noble metal-containing powder includes a platinum-silicon alloy powder that comprises greater than about 85% platinum and up to about 15% silicon.

4. The method of claim 1 wherein said powdered aluminum-bearing component comprises a powdered aluminum alloy.

5. The method of claims 3 wherein said powdered aluminum-bearing component comprises about 95% to about 100% aluminum.

6. The method of claim 1 comprising an additional aluminum-bearing component comprising about 95% to about 100% aluminum.

7. The method of claim 1 wherein said powdered metal coating composition comprises up to about 5% of a member selected from the group consisting of hafnium, yttrium, lanthanum, and mixtures thereof.

8. The method of claim 5 wherein said powdered metal coating composition comprises about 50% to about 80% (by weight of the total applied powdered metal) of said platinum-silicon alloy powder, and about 20% to about 50% (by weight of the total applied powdered metal) of said powdered aluminum-bearing component.

9. A method according to claim 1 wherein said heating the powdered metal-coated substrate to a temperature and for a time sufficient to form a transient liquid phase on the surface of the coated substrate comprises heating the powdered metal-coated substrate to a temperature of at least about 900° F. for a time of at least about 0.25 hours.

10. The method of claim 9 wherein said heating the powdered metal-coated substrate to a temperature and for a time sufficient to form a transient liquid phase on the surface of the coated substrate comprises heating the powdered metal-coated substrate to a temperature of between about 1,100° F. and about 1,400° F. for a time of between about 0.25 hours and about two hours.

11. A method according to claim 1 wherein said heating the powdered metal-coated substrate to a temperature and for a time sufficient to form a transient liquid phase on the surface of the coated substrate comprises heating the powdered metal-coated substrate to first temperature of about 950° F. to about 1,150° F. for about 0.5 to about 1.0 hours, and subsequently heating the coated substrate to a second temperature of about 1,200° F. to about 1,350° F. for about one hour.

12. A method according to claim 1 wherein said heating the substrate with the transient liquid phase thereon to a temperature and for a time sufficient to form a diffused noble metal-aluminide coating on the substrate comprises heating the powdered metal-coated substrate to a temperature of at least about 1,600° F. for a time of at least about one hour.

13. The method of claim 12 wherein said heating the substrate with the transient liquid phase thereon to a temperature and for a time sufficient to form a diffused noble metal-aluminide coating on the substrate comprises heating the powdered metal-coated substrate to a temperature of between about 1,600° F. and about 2,100° F. for a time of between about one hours and about eight hours.

14. The method of claim 1 wherein said powdered metal coating composition is applied via a vehicle.

15. The method of claim 1 wherein said substrate is a nickel alloy or a cobalt alloy.

16. A method of forming a diffused noble metal-aluminide coating on a metallic substrate, said method comprising:
    applying a powdered metal coating composition comprising a noble metal-silicon containing powder and a powdered aluminum-bearing component to a metallic substrate to form a powdered metal-coated substrate;
    heating the powdered metal-coated substrate to a temperature and for a time sufficient to form a transient liquid phase on the surface of the coated substrate; and subsequently
    heating the substrate with the transient liquid phase thereon to a temperature and for a time sufficient to form a diffused noble metal-aluminide coating on the substrate.

17. The method of claim 16 wherein the noble metal-silicon containing powder is a platinum-silicon powder.

18. The method of claim 16 wherein the noble metal-silicon containing powder is a palladium-silicon powder.

19. The method of claim 16 wherein the noble metal-silicon containing powder is a ruthenium-silicon powder.

20. The method of claim 16 wherein the noble metal-silicon containing powder is a rhodium-silicon powder.

21. The method of claim 16 wherein the noble metal-silicon containing powder is a metal alloy.

22. The method of claim 16 wherein the noble metal-silicon containing powder is a pre-alloy powder.

23. The method of claim 16 wherein the noble metal-silicon containing powder includes up to about 5 wt %, based upon the weight of the powder a metal selected form the group consisting of: hafnium, yttrium lanthanium or mixtures thereof.

24. The method of claim 16 wherein said noble metal-containing powder includes a platinum-silicon alloy powder that comprises greater than about 85% platinum and up to about 15% silicon.

25. The method of claim 16 wherein said powdered aluminum-bearing component comprises about 50% to about 75% aluminum and about 25% to about 50% chromium.

26. The method of claim 16 wherein said powdered aluminum-bearing component comprises about 35% to about 45% aluminum, about 35% to about 45% chromium, and about 10% to about 30% manganese.

27. The method of claim 16 wherein said powdered aluminum-bearing component comprises about 95% to about 100% aluminum.

28. The method of claim 25 comprising an additional aluminum-bearing component comprising about 95% to about 100% aluminum.

29. The method of claim 26 comprising an additional aluminum-bearing component comprising about 95% to about 100% aluminum.

30. A method of forming a diffused noble metal-aluminide coating on a metallic substrate, said method comprising:
   (a) applying a powdered metal coating composition comprising about 50% to about 80% (by weight of the total applied powdered metal) of a platinum-silicon alloy powder, and about 20% to about 50% (by weight of the total applied powdered metal) of a powdered aluminum-bearing component, to a metallic substrate to form a powdered metal-coated substrate;
   (b) heating the powdered metal-coated substrate to a temperature and for a time sufficient to form a transient liquid phase on the surface of the coated substrate; and subsequently
   (c) heating the substrate with the transient liquid phase thereon to a temperature and for a time sufficient to form a diffused noble metal-aluminide coating on the substrate.

31. A method of forming a diffused noble metal-aluminide coating on a metallic substrate, said method comprising:
   (a) applying a powdered metal coating composition comprising about 40% to about 80% (by weight of the total applied powdered metal) of a noble metal-containing powder, and about 20% to about 60% (by weight of the total applied powdered metal) of a powdered aluminum-bearing component, to a metallic substrate to form a powdered metal-coated substrate;
   (b) heating the powdered metal-coated substrate to a temperature of between about 1,100° F. and about 1,400° F. for a time of between about 0.25 and about two hours sufficient to form a transient liquid phase on the surface of the coated substrate; and subsequently
   (c) heating the substrate with the transient liquid phase thereon to a temperature and for a time sufficient to form a diffused noble metal-aluminide coating on the substrate.

32. A method of forming a diffused noble metal-aluminide coating on a metallic substrate, said method comprising:
   (a) applying a powdered metal coating composition comprising about 40% to about 80% (by weight of the total applied powdered metal) of a noble metal-containing powder, and about 20% to about 60% (by weight of the total applied powdered metal) of a powdered aluminum-bearing component, to a metallic substrate to form a powdered metal-coated substrate;
   (b) heating the powdered metal-coated substrate to a to first temperature of about 950° F. to about 1,150° F. for about 0.5 to about 1.0 hours, and subsequently heating the coated substrate to a second temperature of about 1,200° F. to about 1,350° F. for about one hour sufficient to form a transient liquid phase on the surface of the coated substrate; and subsequently
   (c) heating the substrate with the transient liquid phase thereon to a temperature and for a time sufficient to form a diffused noble metal-aluminide coating on the substrate.

* * * * *